(12) United States Patent
Kim et al.

(10) Patent No.: US 10,755,860 B2
(45) Date of Patent: Aug. 25, 2020

(54) MULTILAYER CERAMIC ELECTRONIC COMPONENT

(71) Applicant: SAMSUNG ELECTRO-MECHANICS CO., LTD., Suwon-si, Gyeonggi-do (KR)

(72) Inventors: Kyeong Jun Kim, Suwon-si (KR); Jang Hyun Lee, Suwon-si (KR); Hae Suk Chung, Suwon-si (KR); Do Lee, Suwon-si (KR); Byung Sung Kang, Suwon-si (KR); Ho In Jun, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/274,636

(22) Filed: Feb. 13, 2019

(65) Prior Publication Data
US 2020/0152389 A1    May 14, 2020

(30) Foreign Application Priority Data
Nov. 9, 2018    (KR) .......................... 10-2018-0137296

(51) Int. Cl.
*H01G 4/30*    (2006.01)
*H01G 4/012*    (2006.01)
(Continued)

(52) U.S. Cl.
CPC .............. *H01G 4/30* (2013.01); *H01G 4/012* (2013.01); *H01G 4/1227* (2013.01); *H01G 4/232* (2013.01)

(58) Field of Classification Search
CPC ................................ H01G 4/30; H01G 4/232
See application file for complete search history.

(56) References Cited

U.S. PATENT DOCUMENTS

| | | | | |
|---|---|---|---|---|
| 5,040,092 A | * | 8/1991 | Katho | ...................... H01G 4/30 361/321.2 |
| 2002/0075632 A1 | * | 6/2002 | Nakano | ..................... H01G 4/12 361/320 |

(Continued)

FOREIGN PATENT DOCUMENTS

| JP | 2007-042743 A | 2/2007 |
|---|---|---|
| JP | 2014-220324 A | 11/2014 |
| JP | 2015-018891 A | 1/2015 |

*Primary Examiner* — Eric W Thomas
(74) *Attorney, Agent, or Firm* — Morgan, Lewis & Bockius LLP

(57) ABSTRACT

A multilayer ceramic electronic component includes: a ceramic body having a dielectric layer, and a plurality of first and second internal electrodes facing each other with the dielectric layer interposed therebetween; and first and second external electrodes disposed on an outer surface of the ceramic body, respectively. The ceramic body includes an active portion including a plurality of internal electrodes facing each other with the dielectric layer interposed therebetween to form capacitance, and cover portions formed on upper and lower portions of the active portion. A buffer region is disposed between at least one pair of first and second internal electrodes among the plurality of first and second internal electrodes disposed inside the active portion, and satisfies the relation $0 < tb < 150$ μm+td, where td is a thickness of the dielectric layer, and tb is a thickness of the buffer region.

12 Claims, 3 Drawing Sheets

(51) Int. Cl.
*H01G 4/232* (2006.01)
*H01G 4/12* (2006.01)

(56) References Cited

U.S. PATENT DOCUMENTS

| | | | |
|---|---|---|---|
| 2003/0041427 A1* | 3/2003 | Hattori | H01G 4/30 |
| | | | 29/25.42 |
| 2007/0025054 A1 | 2/2007 | Tonogai et al. | |
| 2014/0204502 A1* | 7/2014 | Chun | H01G 4/30 |
| | | | 361/301.4 |
| 2014/0254063 A1* | 9/2014 | Konishi | H01G 4/005 |
| | | | 361/301.4 |
| 2016/0172109 A1 | 6/2016 | Kobayashi et al. | |
| 2016/0293331 A1* | 10/2016 | Kitamura | H01G 4/30 |

* cited by examiner

MULTILAYER CERAMIC ELECTRONIC COMPONENT

CROSS-REFERENCE TO RELATED APPLICATION(S)

This application claims the benefit of priority to Korean Patent Application No. 10-2018-0137296 filed on Nov. 9, 2018 in the Korean Intellectual Property Office, the disclosure of which is incorporated herein by reference in its entirety.

TECHNICAL FIELD

The present disclosure relates to a multilayer ceramic electronic component, and more specifically, to a high-voltage multilayer ceramic electronic component having improved withstand voltage properties.

BACKGROUND

Along with the recent trend for the miniaturization of electronic products, there has been a demand for multilayer ceramic electronic components to be compact in size, while having high capacitance.

To achieve the above, there have been various attempts made to reduce the thickness of a dielectric layer and an internal electrode, and also for the implementation thereof in multiple layers. In this context, recently, multilayer ceramic electronic components using a thinned dielectric layer and having an increased number of layers have been produced.

In particular, there has been an increasing demand for multilayer ceramic electronic components for high voltage application, to have high withstand voltage properties.

However, such a dielectric layer, when not sufficiently thick, may break down under a relatively low voltage, and thus cannot be utilized for high voltage applications.

Therefore, such a dielectric layer may be designed to have a large thickness for high voltage application, thereby reducing an applied voltage per unit thickness thereof, to be able to withstand high voltages.

Further, to achieve high-voltage reliability of capacitance and high reliability, a thick dielectric layer may be disposed in the center portion of a multilayer ceramic capacitor, so the multilayer ceramic capacitor may have a structure in which a ceramic buffer layer is disposed in the center of repeatedly layered internal electrode layers.

However, a conventional ceramic buffer layer may not be sufficiently effective in improving withstand voltage properties due to its thickness being small. Further, although a ceramic buffer layer having a thickness above a certain level may lead to an increase in withstand voltage properties, when the thickness of such a ceramic buffer layer becomes excessively large, the thickness of an active portion may be reduced as a result, leading to a decrease in withstand voltage properties. Therefore, it is necessary to determine an appropriate thickness range for the ceramic buffer layer.

SUMMARY

An aspect of the present disclosure is to provide a multilayer ceramic electronic component, in particular, a high-voltage multilayer ceramic electronic component having improved withstand voltage properties.

According to an aspect of the present disclosure, a multilayer ceramic electronic component includes: a ceramic body having a dielectric layer, and a plurality of first and second internal electrodes facing each other with the dielectric layer interposed therebetween, and having first and second surfaces facing each other in a first direction, third and fourth surfaces connected to the first and second surfaces and facing each other in a second direction, and fifth and sixth surfaces connected to the first to fourth surfaces and facing each other in a third direction; and first and second external electrodes disposed on an outer surface of the ceramic body and electrically connected to the plurality of first and second internal electrodes, respectively. The ceramic body includes an active portion including a plurality of internal electrodes facing each other with the dielectric layer interposed therebetween to form capacitance, and includes cover portions formed on upper and lower portions of the active portion. A buffer region is disposed between at least one pair of first and second internal electrodes among the plurality of first and second internal electrodes disposed inside the active portion, and satisfies the relation $0 < tb < 150$ $\mu m + td$, where td is a thickness of the dielectric layer, and tb is a thickness of the buffer region.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
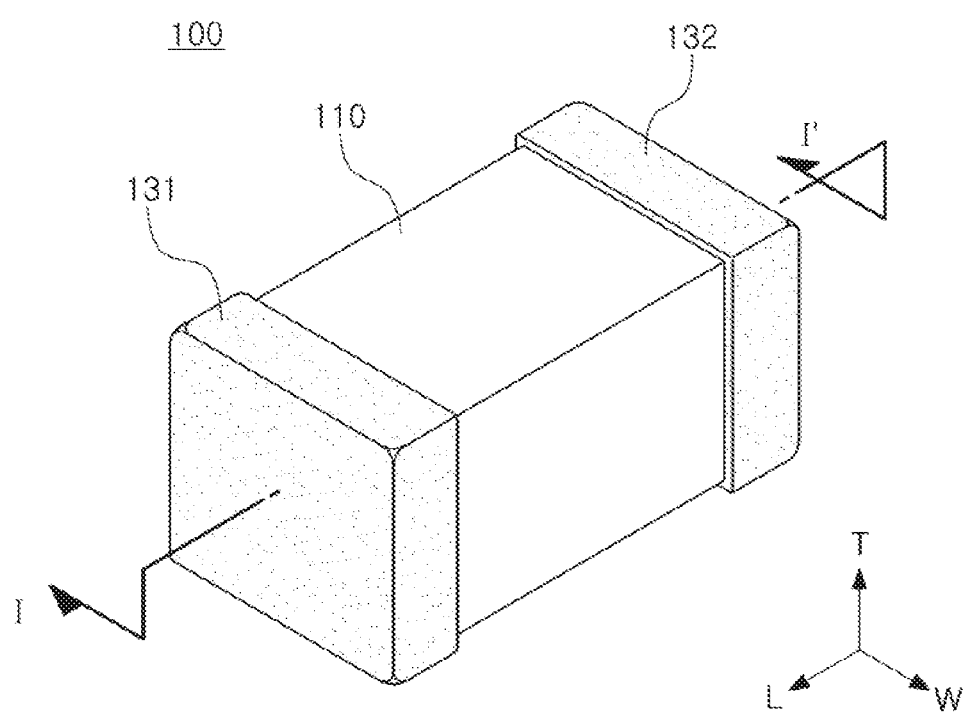
FIG. 1 is a perspective view of a multilayer ceramic capacitor according to an exemplary embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are same elements in the drawings.

Further, throughout the specification, it will be understood that when a portion "includes" an element, it can further include another element, not excluding another element, unless otherwise indicated.

In the drawings, certain elements may be omitted to clearly describe the present disclosure, and to clearly express a plurality of layers and areas, thicknesses may be magnified. The same elements having the same function within the scope of the same concept will be described with use of the same reference numeral.

While exemplary embodiments have been shown and described above, it will be apparent to those skilled in the art that modifications and variations could be made without departing from the scope of the present invention as defined by the appended claims.

FIG. 1 is a perspective view illustrating a multilayer ceramic capacitor according to an exemplary embodiment.

Figure 2:
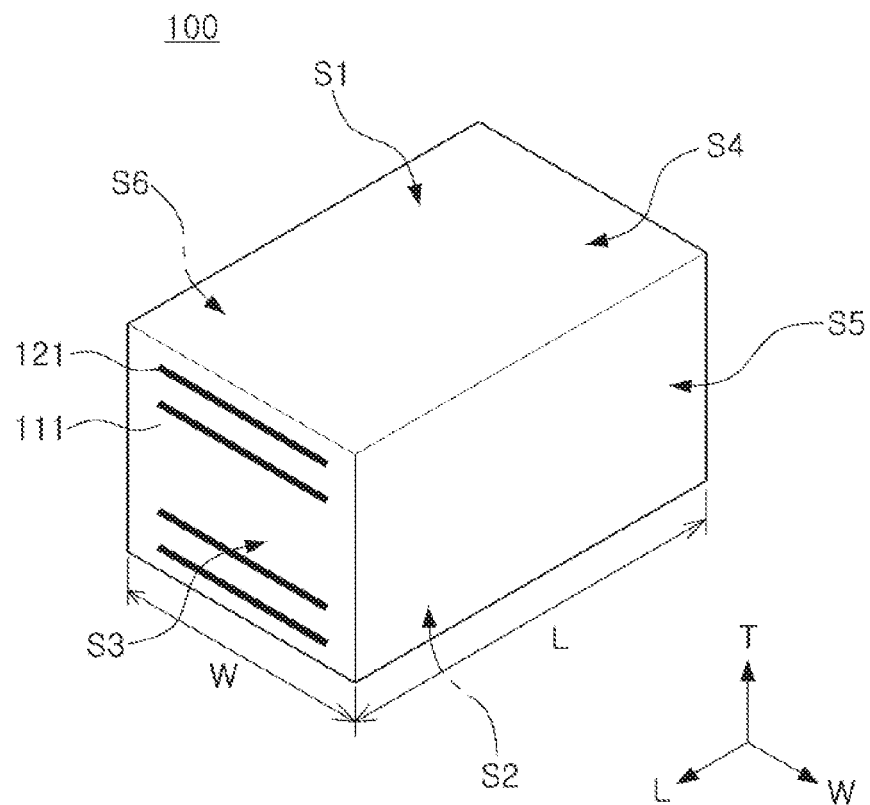
FIG. 2 is a schematic diagram showing a ceramic body according to an exemplary embodiment of the present disclosure.

FIG. 2 is a schematic diagram illustrating a ceramic body according to an exemplary embodiment.

Figure 3:
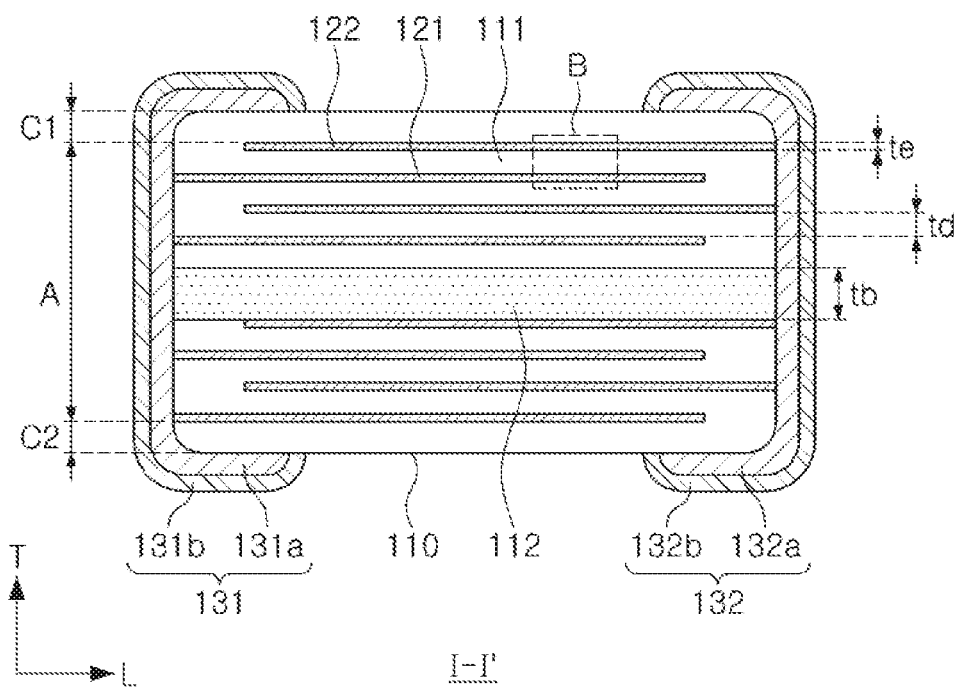
FIG. 3 is a cross-sectional view of a multilayer ceramic capacitor according to one exemplary embodiment, taken along line I-I' of FIG. 1.

FIG. 3 is a cross-sectional view illustrating a multilayer ceramic capacitor, taken along line I-I' of FIG. 1.

Referring to FIGS. 1 to 3, a multilayer ceramic electronic component 100 according to an exemplary embodiment may include: a ceramic body 110 having a dielectric layer 111, a plurality of internal electrodes 121 and 122 facing each other with the dielectric layer 111 interposed therebetween, and including a first surface S1 and a second surface S2 facing each other in a first direction (or stacking direction), a third surface S3 and a fourth surface S4 connected to the first surface S1 and the second surface S2 and facing each other in a second direction (or length direction), and a fifth surface S5 and a sixth surface S6 connected to the first to fourth surfaces S1 to S4 and facing each other in a third direction (or width direction); and external electrodes 131 and 132 disposed on an outer surface of the ceramic body 110 and electrically connected to the plurality of internal electrodes 121 and 122, wherein the ceramic body 110 includes an active portion A including a plurality of internal electrodes 121 and 122 facing each other with the dielectric layer 111 interposed therebetween to form capacitance, and cover portions C1 and C2 formed on upper and lower portions of the active portion A.

In the description below, a multilayer ceramic electronic component, particularly, a multilayer ceramic capacitor according to an exemplary embodiment will be described, but the multilayer ceramic electronic component is not limited thereto.

As for the multilayer ceramic capacitor according to the exemplary embodiment, a length direction may be defined as an "L" direction, a width direction as a "W" direction, and a thickness direction as a "T" direction shown in FIG. 1, wherein the thickness direction may be the same as a layering direction, a direction in which dielectric layers are stacked.

In the exemplary embodiment, the ceramic body 110 is not limited to any particular shape. As illustrated, the ceramic body 110 may have a hexagonal shape, for example.

The ceramic body 110 may include the first surface S1 and the second surface S2 facing each other in the first direction, the third surface S3 and the fourth surface S4 connected to the first surface S1 and the second surface S2 and facing each other in the second direction, and the fifth surface S5 and the sixth surface S6 connected to the first to fourth surfaces S1 to S4 and facing each other in the third direction.

The first surface S1 and the second surface S2 may be defined as surfaces facing each other in the thickness direction of the ceramic body 110, which is the first direction. The third surface S3 and the fourth surface S4 may be defined as surfaces facing each other in the length direction of the ceramic body 110, which is the second direction. The fifth surface S5 and the sixth surface S6 may be defined as surfaces facing each other in the width direction of the ceramic body 110, which is the third direction.

One ends of the plurality of internal electrodes 121 and 122 disposed in the ceramic body 110 may be exposed to the third surface S3 or the fourth surface S4 of the ceramic body 110.

As for the internal electrodes 121 and 122, the first internal electrode 121 and the second internal electrode 122 having different polarities may be one pair.

One end of the first internal electrode 121 may be exposed to the third surface S3, and one end of the second internal electrode 122 may be exposed to the fourth surface S4.

The other ends of the first and second electrodes 121 and 122 may be spaced apart from the fourth surface S4 and the third surface S3, which will be described in more detail hereinbelow.

The first and second external electrodes 131 and 132 may be formed on the third surface S3 and the fourth surface S4 of the ceramic body 110 to be electrically connected to the internal electrodes.

According to the exemplary embodiment, the material constituting the dielectric layer 111 is not limited to any particular material as long as it provides sufficient capacitance, and for example, the material may use a barium titanate-based material, a lead-based perovskite-based material, a strontium titanate-based material, or the like.

The material constituting the dielectric layer 111 may be powder such as barium titanate (BaTiO3), which may be mixed with a variety of ceramic additives, organic solvents, plasticizers, binders, dispersants, or the like, according to the purpose of the invention.

The ceramic body 110 may be formed to include the active portion A, which serves as a portion contributing to forming capacitance of a capacitor, and an upper cover portion C1 and a lower cover portion C2 formed on upper and lower portions of the active portion A, respectively, which serve as upper and lower margin portions.

The active portion A may be formed by repeatedly stacking the plurality of first and second internal electrodes 121 and 122 one on top of the other with the dielectric layer 111 interposed therebetween.

The upper cover portion C1 and the lower cover portion C2 may have the same material and configuration as the dielectric layer 111 except for the upper and lower cover portions C1 and C2 not including the internal electrodes.

For example, the upper cover portion C1 and the lower cover portion C2 may include a ceramic material, and for example, may include a barium titanate (BaTiO$_3$)-based ceramic material.

The upper cover portion C1 and the lower cover portion C2 may be formed by disposing a single dielectric layer, or layering two or more dielectric layers on upper and lower surfaces of the active portion A in upward and downward directions, respectively. The upper cover portion C1 and the lower cover portion C2 may play a role in protecting the internal electrodes from physical or chemical stress.

The first and second internal electrodes 121 and 122, may be electrically connected to the first and second external electrodes 131 and 132, respectively, through portions alternately exposed to both surfaces in a length direction of the ceramic body 110.

Accordingly, when a voltage is transferred to the first and second external electrodes 131 and 132, charges are accumulated between the first and second internal electrodes 121 and 122 facing each other, wherein capacitance of the multilayer ceramic capacitor 100 is proportional to an area overlapped by the first and second internal electrodes 121 and 122.

Thickness of each of the first and second internal electrodes 121 and 122 may be determined according to their intended use. For example, on the basis of a size of the ceramic body 110, the thickness may be determined to be less than 1.0 μm, and may have a lower limit greater than or equal to 0.2 μm, without being limited thereto.

In addition, the material constituting the first and second electrodes 121 and 122 are not particularly limited. For example, the material may use a conductive paste containing at least one material selected from silver (Ag), lead (Pb), platinum (Pt), nickel (Ni), and copper (Cu).

In addition, a printing method for the conductive paste may be a screen printing method, a gravure printing method, or the like, but is not limited thereto.

According to the exemplary embodiment of the present application, a buffer region 112 may be disposed between at least one pair among the plurality of first and second internal electrodes 121 and 122 disposed inside the active portion A.

In other words, the active portion A may be divided by a plurality of pairs including one first internal electrode 121 and one second internal electrode 122, and the buffer region 112 may be disposed between a first pair of the plurality of pairs and a second pair adjacent thereto.

Here, one surface of the buffer region 112 may be in contact with the second internal electrode 122 of the second pair, and another surface of the buffer region 112 may be spaced apart from the first internal electrode 121 of the first pair.

According to the exemplary embodiment, the relation $0<tb<150$ μm+td may be satisfied, where td is a thickness of the dielectric layer 111, and tb is a thickness of the buffer region 112.

The multilayer ceramic capacitor according to one embodiment is a component for high voltage use, and in order to improve withstand voltage properties by increasing breakdown voltage (BDV), may have the buffer region 112 disposed between at least one pair of the first and second internal electrodes 121 and 122 among the plurality of first and second electrodes 121 and 122 disposed inside the active portion A, and may satisfy the relation $0<tb<150$ μm+td, where tb is a thickness of the buffer region 112.

In particular, the high voltage may refer to a voltage band in the range of 1-5 KV, but is not limited thereto. For example, the multilayer ceramic capacitor may be adapted to a middle voltage in the range of 100-630 V.

When the active portion A does not include the buffer region 112, there may be a problem of BDV being reduced with respect to a high voltage transferred to the multilayer ceramic electronic component.

In addition, when the thickness tb of the buffer region 112 has a value greater than or equal to 150 μm+td, the thickness tb of the buffer region 112 is relatively large, which results in the thickness td of the dielectric layer 111 being relatively small, so in this case, the BDV may rather decrease.

For example, when the thickness td of the dielectric layer 111 is constant, up to a threshold value, the BDV may continue to increase along with an increase of the thickness tb of the buffer region 112, so the withstand voltage properties may be improved. However, when the thickness td of the dielectric layer 111 is greater than or equal to the threshold value, the BDV may stay constant without increasing further.

As described above, according to the exemplary embodiment, when the thickness td of the dielectric layer 111 stays constant, the thickness tb of the buffer region 112 may have a maximum threshold value of 150 μm, being based thereon.

For example, when the thickness tb of the buffer region 112 has a value less than 150 μm+td, the BDV may increase, thus improving withstand voltage properties.

Meanwhile, when the thickness tb of the buffer region 112 has a value greater than or equal to 150 μm+td, the BDV may rather decrease.

Accordingly, as shown in the exemplary embodiment, the buffer region 112 may be disposed between at least one pair of the first and second internal electrodes 121 and 122 among the plurality of the first and second internal electrodes 121 and 122 disposed inside the active portion A, and the thickness tb of the buffer region 112 may satisfy the relation $0<tb<150$ μm+td, to increase the BDV and thereby improve withstand voltage properties.

The thickness td of the dielectric layer 111 may be an average thickness, which may be 1.2 μm or more to less than 2.8 μm, but is not limited thereto.

According to the exemplary embodiment, the multilayer ceramic electronic component may be for high voltage use, the thickness of the dielectric layer 111 may be greater than the thickness of each of the first and second internal electrodes 121 and 122.

The thickness td of the dielectric layer 111, as will be described below, may satisfy $td>2\times te$ in relation to the thickness te of each of the first and second internal electrodes 121 and 122.

As described above, the thickness of the dielectric layer 111 may be greater than the thickness of each of the first and second internal electrodes 121 and 122, to realize a high-voltage multilayer ceramic capacitor.

Furthermore, according to the exemplary embodiment, the thickness tb of the buffer region 112 may satisfy the relation $0<tb<150$ μm+td, to increase BDV, thus improving withstand voltage properties.

For example, on the basis of a thickness td of the dielectric layer 111 being 1.2 μm, the BDV is high, thus improving withstand voltage properties, when a thickness tb of the buffer region 112 is in the range of 150+1.2 μm.

For example, on the basis of the thickness td of the dielectric layer 111 being less than 2.8 μm, the BDV may be high, thus improving withstand voltage properties, when the thickness tb of the buffer region 112 is in the range of 150+2.8 μm.

The buffer region 112 may be formed by the same composition as the dielectric layer 111, but is not necessarily limited thereto.

The buffer region 112, when formed of the same composition as that of the dielectric layer 111, may form an excellent bond with the dielectric layer 111 disposed on the upper or lower portion of the buffer region 112, thus serving to improve reliability.

Meanwhile, the thickness tb of the buffer region 112 may satisfy the relation $0<tb<100$ μm+td.

As the thickness tb of the buffer region 112 satisfies the relation $0<tb<100$ μm+td, the BDV may increase, thus further improving withstand voltage properties.

According to the exemplary embodiment, the buffer region 112 may be singly disposed in a center portion of the ceramic body 110.

In a high-voltage multilayer ceramic capacitor, regions that suffer a problem associated with withstand voltage reliability due to a low BDV are usually the center portion of a ceramic body. In this context, according to one exemplary embodiment, one buffer region 112 having a thickness that satisfies the relation $0<tb<150$ μm+td, may be disposed in the center portion of the ceramic body 110, to realize a multilayer ceramic capacitor having excellent withstand voltage properties without suffering a decrease in capacitance.

Figure 4:
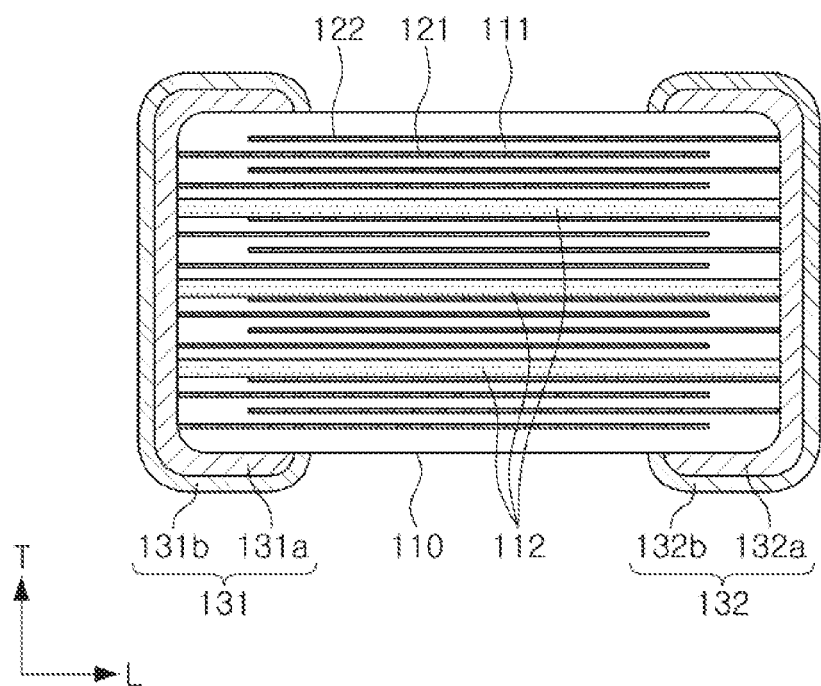
FIG. 4 is a cross-sectional view of a multilayer ceramic capacitor according to another exemplary embodiment, taken along line I-I' of FIG. 1.

FIG. 4 is a cross-sectional view of a multilayer ceramic capacitor according to another exemplary embodiment, taken along line I-I' of FIG. 1.

Referring to FIG. 4, the multilayer ceramic electronic component according to another exemplary embodiment may have a plurality of buffer regions 112 disposed in an active portion A.

FIG. 4 illustrates the buffer regions 112, total three in number, one of which is disposed in a center portion of a ceramic body 110, and two of which are disposed on upper and lower parts of the ceramic body 110, respectively. However, the buffer regions 112 are not limited thereto. For example, two buffer regions 112 may be disposed inside the active portion A, or four or more buffer regions 112 may be disposed inside the active portion A.

According to another exemplary embodiment, the buffer regions 112 may be multiple in number and disposed inside the active portion A, particularly, in regions inside the ceramic body 110 that are vulnerable to high voltage, so that withstand voltage reliability may be further improved along with an increase in BDV.

The multilayer ceramic capacitor according to the exemplary embodiment may include a first external electrode 131 electrically connected to the first internal electrode 121, and a second external electrode 132 electrically connected to the second internal electrode 122.

The first and second external electrodes 131 and 132 may be electrically connected to the first and second internal electrodes 121 and 122 to form capacitance, and the second external electrode 132 may be connected to a different electric potential than the first external electrode 131.

The first and second external electrodes 131 and 132 may be disposed on the third surface S3 and the fourth surface S4, respectively, in a length direction of the ceramic body 110, which is a second direction, and may extend to be disposed on the first surface S1 and the second surface S2 in a thickness direction of the ceramic body 110, which is a first direction.

The external electrodes 131 and 132 may be disposed on an outer surface of the ceramic body 110, and may include electrode layers 131a and 132a electrically connected to the internal electrodes 121 and 122, and conductive resin layers 131a and 132b disposed on the electrode layers 131a and 132a.

The electrode layers 131a and 132a may include a conductive metal and glass.

The conductive metal used for the electrode layers 131a and 132a is not limited to any particular material as long as it can be electrically connected to the internal electrodes to form capacitance, and for example, may be at least one selected from the group consisting of copper (Cu), silver (Ag), nickel (Ni), and alloys thereof.

The electrode layers 131a and 132a may be formed by applying a conductive paste formed by adding glass frit to a powder of the conductive metal and performing a sintering process.

The conductive resin layers 131b and 132b may be formed on the electrode layers 131a and 132a, and may be formed so as to completely cover the electrode layers 131a and 132b.

For example, a distance from an outer edge of each of the electrode layers 131a and 132a to an end of each of the respective electrode layers 131a and 132a extended on the first and second surfaces S1 and S2 of the ceramic body 110, may be smaller than a distance from an outer edge of each of the conductive resin layers 131b and 132b to an end of each of the respective conductive resin layers 131b and 132b extended on the first and second surfaces S1 and S2 of the ceramic body 110.

A base resin contained in the conductive resin layers 131b and 132b may have bonding properties and shock-absorbing properties, and is not limited to any particular material as long as it can form a paste by being mixed with a conductive metal powder. For example, the base resin may include an epoxy resin.

A conductive metal contained in the conductive resin layers 131a and 132b is not limited to any particular material as long as it can be electrically connected to the electrode layers 131a and 132a. For example, the conductive metal may include at least one selected from the group consisting of copper (Cu), silver (Ag), nickel (Ni), and alloys thereof.

Figure 5:
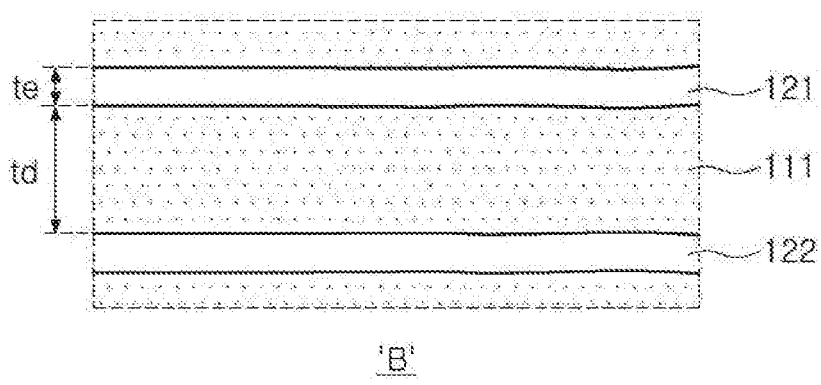
FIG. 5 is an enlarged view of region B of FIG. 3.

FIG. 5 is an enlarged view of region B of FIG. 3.

FIG. 5 illustrates a multilayer ceramic electronic component according to an exemplary embodiment, wherein td>2× te, where td is a thickness of the dielectric layer 111, and te is a thickness of each of the internal electrodes 121 and 122.

For example, according to the exemplary embodiment, a thickness td of the dielectric layer 111 is characterized by being two times larger than a thickness te of each of the internal electrodes 121 and 122.

In general, one of major issues in high-voltage automotive electronic components has been degradation in reliability due to a decrease in DBV under high-voltage environments.

In a multilayer ceramic capacitor according to the exemplary embodiment, to prevent degradation in DBV under high-voltage environments, the dielectric layer 111 may have a thickness td two or more times larger than a thickness te of each of the internal electrodes 121 and 122, such that the thickness of the dielectric layer, which corresponds to a distance between the internal electrodes, increases, thus improving DBV properties.

When a thickness td of the dielectric layer 111 is less than or equal to two times a thickness te of each of the internal electrodes 121 and 122, DBV may decrease due to the thickness of the dielectric layer, which corresponds to a distance between the internal electrodes, being small.

The thickness te of each of the internal electrodes 121 and 122 may be less than 1 μm, and the thickness td of the dielectric layer 111 may be less than or equal to 2.8 μm, without being limited thereto.

Also, the thickness td of the dielectric layer 111 may be 1.2 μm or more to less than 2.8 μm, but is not limited thereto.

A method of manufacturing a multilayer ceramic electronic component according to an exemplary embodiment of the present disclosure will be described below; however, the method is not limited thereto.

In the method of manufacturing a multilayer ceramic electronic component according to the exemplary embodiment, a carrier film is coated with a slurry containing powder such as barium titanate (BaTiO3), and then dried to form a plurality of ceramic green sheets, thus forming dielectric layers.

The ceramic green sheet may be a sheet having a certain thickness (μm), which may be manufactured using a slurry formed from a mixture of a ceramic powder, a binder, and a solvent, and by performing a doctor blade process on the slurry.

Subsequently, the conductive paste for an internal electrode, containing 40-50 parts by weight of nickel powder in which an average particle size of nickel is 0.1-0.2 μm, may be prepared.

Next, an internal electrode may be formed by applying the conductive paste for an internal electrode on the green sheet using a screen printing method, and then, the green sheets having internal electrode patterns disposed thereon may be layered to form a ceramic body 110.

In particular, according to the exemplary embodiment, multiple layers of ceramic green sheets for forming buffer regions, separately prepared, may be layered and introduced in a process of stacking the green sheets having the internal electrodes patterns disposed thereon, to form buffer regions inside an active portion.

The method of manufacturing a multilayer ceramic electronic component is not limited to the method described above, and for example, in the process of layering the green sheets having the internal electrode patterns disposed thereon, a ceramic slurry for forming a buffer region may be applied or printed on upper parts of the internal electrode patterns to form a buffer region inside the active portion.

When forming the buffer region inside the active portion by using the ceramic slurry for forming a buffer region, the ceramic slurry may be applied or printed in multiple layers.

Next, on an outer surface of the ceramic body, an electrode layer may be formed to include glass and at least one conductive metal selected from the group consisting of copper (Cu), silver (Ag), nickel (Ni), and alloys thereof.

The glass is not limited to any particular material, and may be a material of the same composition as that of glass commonly used for external electrodes for a multilayer ceramic capacitor.

The electrode layer may be formed on upper and lower surfaces and ends of the ceramic body, to be electrically connected to the first and second internal electrodes, respectively.

The electrode layer may contain 5 vol % or more of the glass with respect to the conductive metal.

Next, a conductive resin composition may be applied on the electrode layers 131a and 132a and cured to form conductive resin layers 131b and 132b.

The conductive resin layers 131b and 132b may contain a base resin and at least one conductive metal selected from the group consisting of copper (Cu), silver (Ag), nickel (Ni), and alloys thereof, and the base resin may be, for example, an epoxy resin.

As set forth above, according to the exemplary embodiments in the present disclosure, by adjusting a thickness of a buffer region disposed inside an active portion of a ceramic body, a high-voltage multilayer ceramic electronic component having improved withstand voltage properties may be realized.

While exemplary embodiments have been shown and described above, it will be apparent to those skilled in the art that modifications and variations could be made without departing from the scope of the present invention as defined by the appended claims.

What is claimed is:
1. A multilayer ceramic electronic component comprising:
a ceramic body including a plurality of dielectric layers and a plurality of first and second internal electrodes facing each other with the plurality of dielectric layers interposed therebetween, respectively, and having first and second surfaces facing each other in a stacking direction, third and fourth surfaces connected to the first and second surfaces and facing each other in a length direction, and fifth and sixth surfaces connected to the first to fourth surfaces and facing each other in a width direction; and
first and second external electrodes disposed on the third and fourth surfaces of the ceramic body, respectively, and electrically connected to the plurality of first and second internal electrodes, respectively,
wherein the ceramic body includes an active portion including the plurality of first and second internal electrodes, and cover portions disposed on upper and lower surfaces of the active portion in the stacking direction,
wherein a buffer region is disposed between at least one pair of first and second internal electrodes among the plurality of first and second internal electrodes disposed inside the active portion,
wherein at least one dielectric layer among the plurality of dielectric layers is disposed on an upper or lower surface of the buffer region and is in direct contact with the buffer region,
wherein a dielectric material of the buffer region is different from a dielectric material of the dielectric layer,
wherein a thickness of the buffer region satisfies the relation of $0<tb<150$ μm+td, where a thickness of each dielectric layer is denoted by "td", and the thickness of the buffer region is denoted by "tb",
wherein the thickness td of each dielectric layer is 1.2 μm or more and less than 2.8 μm, and
wherein a thickness of each of the plurality of first and second internal electrodes is denoted by "te", and td>2 ×te.

2. The multilayer ceramic electronic component of claim 1, wherein the thickness of the buffer region satisfies the relation of $0<tb<100$ μm+td.

3. The multilayer ceramic electronic component of claim 1, wherein the buffer region is disposed in a center portion of the ceramic body as a single layer.

4. The multilayer ceramic electronic component of claim 1, wherein the buffer region is disposed in plural inside the active portion.

5. The multilayer ceramic electronic component of claim 1, wherein a thickness of each of the plurality of first and second internal electrodes is denoted by "te", and te is less than 1 μm.

6. The multilayer ceramic electronic component of claim 5, wherein the thickness te of each of the plurality of first and second internal electrodes is 0.2 μm or more.

7. The multilayer ceramic electronic component of claim 1, wherein each of the first and second external electrodes includes an electrode layer electrically connected to the plurality of first or second internal electrodes, and a conductive resin layer disposed on the electrode layer, and
the electrode layer and the conductive resin layer are each extend in the length direction on the first and second surfaces of the ceramic body.

8. The multilayer ceramic electronic component of claim 7, wherein a length of an extending portion of the electrode layer, measured from a corner edge of the electrode layer close to the third or fourth surface to an end of the extending portion of the electrode layer extending on the respective first or second surface, is smaller than a length of an extending portion of the conductive resin layer, measured from a corner edge of the conductive resin layer close to the third or fourth surface to an end of the extending portion of the conductive resin layer extending on the respective first or second surface.

9. The multilayer ceramic electronic component of claim 7, wherein the electrode layer includes at least one conductive metal selected from the group consisting of copper (Cu), silver (Ag), nickel (Ni), and alloys thereof.

10. The multilayer ceramic electronic component of claim 7, wherein the conductive resin layer includes a base resin and at least one conductive metal selected from the group consisting of copper (Cu), silver (Ag), nickel (Ni), and alloys thereof.

11. The multilayer ceramic electronic component of claim 1, wherein the active portion is divided by a plurality of pairs comprising one first internal electrode and one second internal electrode, and the buffer region is disposed between a first pair of the plurality of pairs and a second pair adjacent to the first pair.

12. The multilayer ceramic electronic component of claim 11, wherein one surface of the buffer region is in contact with one second internal electrode of the second pair, and another surface of the buffer region is spaced apart from the one first internal electrode of the first pair.

* * * * *